Feb. 20, 1923.

G. D. WILKINSON ET AL.
GAS RANGE.
FILED APR. 17, 1922.

1,445,985.

2 SHEETS—SHEET 1.

Feb. 20, 1923.
G. D. WILKINSON ET AL.
GAS RANGE.
FILED APR. 17, 1922.
1,445,985.
2 SHEETS—SHEET 2.
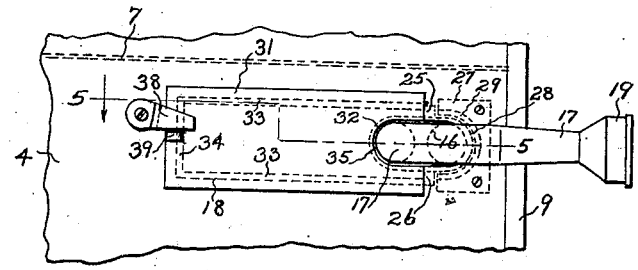
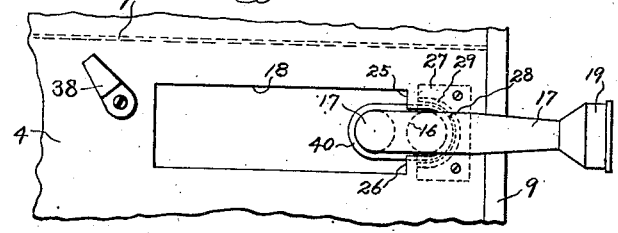
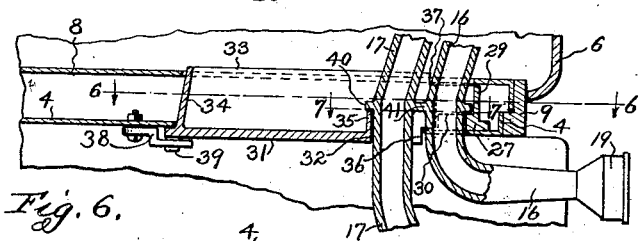
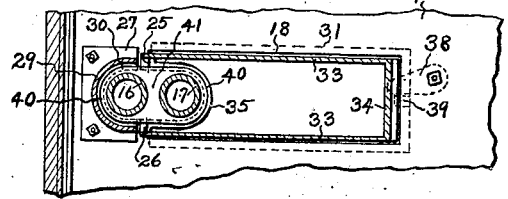
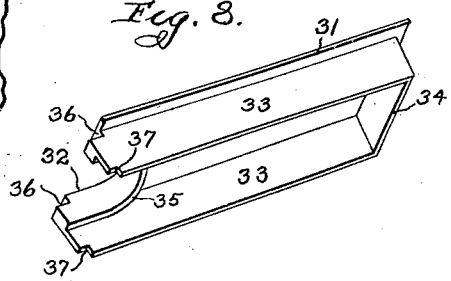

Patented Feb. 20, 1923.

1,445,985

UNITED STATES PATENT OFFICE.

GEORGE D. WILKINSON AND AUGUSTUS F. HARTER, OF OAK PARK, ILLINOIS, ASSIGNORS TO CRIBBEN & SEXTON COMPANY, OF CHICAGO, ILLINOIS, A CORPORATION OF ILLINOIS.

GAS RANGE.

Application filed April 17, 1922. Serial No. 553,993.

*To all whom it may concern:*

Be it known that we, GEORGE D. WILKINSON and AUGUSTUS F. HARTER, citizens of the United States, both residing at Oak Park, in the county of Cook, State of Illinois, having jointly invented certain new and useful Improvements in Gas Ranges, do hereby declare that the following is a full, clear, and exact description of the same.

Our invention relates to gas stoves or ranges, and consists in the novel and useful constructions herein described and then pointed out in the appended claims.

Figure 1:
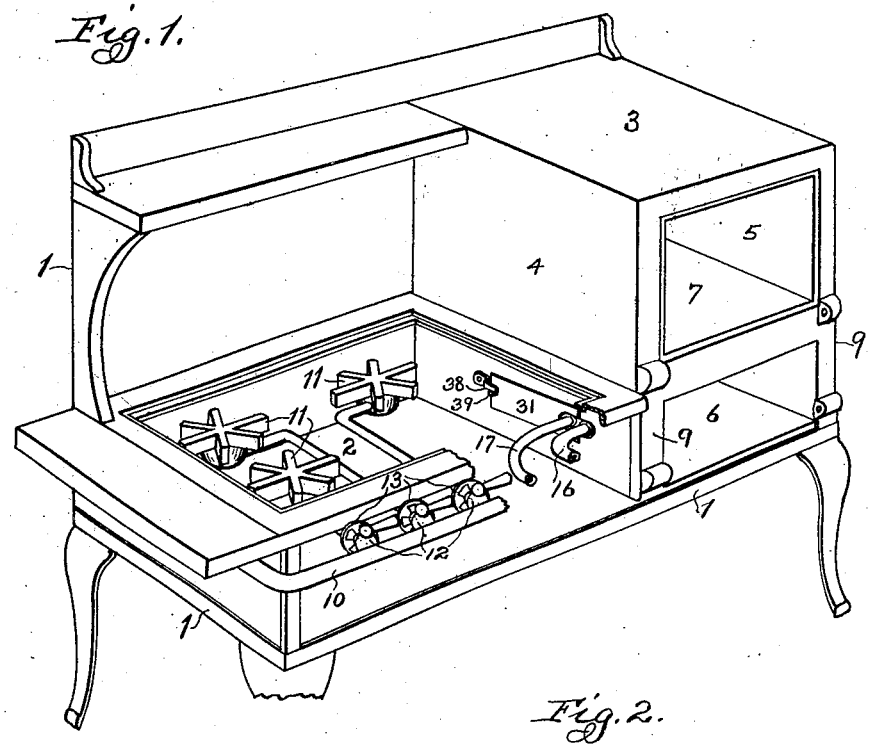
Figure 2:
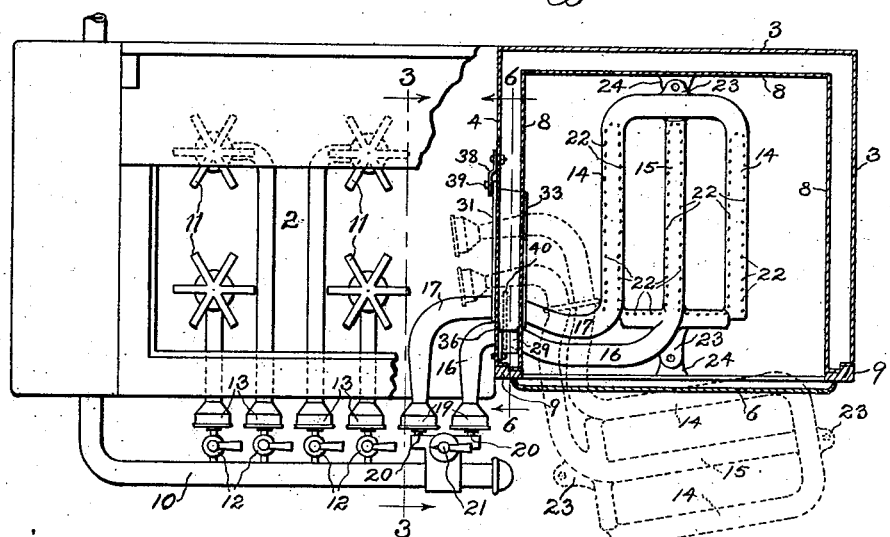

In the accompanying drawings, which illustrate a practical embodiment of our present invention and in which the same reference numerals indicate similar parts in the different figures, Fig. 1 is a perspective view of a gas range equipped with our invention, parts of the range being broken away for clearness of illustration; Fig. 2 is a view partly in top plan and partly in section through the broiling-oven on a line above the oven-burner which is shown in full lines in its normal position and in dotted lines turned to pass its supply pipes through an aperture in the oven side wall in positioning or withdrawing the burner; Fig. 3 is a detail vertical sectional view on the line 3—3 of Fig. 2 with the removable closure plate for the pipe-aperture in place; Fig. 4 is a similar view with the closure plate removed; Fig. 5 is a detail horizontal sectional view on the line 5—5 of Fig. 3; Fig. 6 is a detail vertical sectional view on the line 6—6 of Figs. 2 and 5; Fig. 7 is a similar view on the line 7—7 of Fig. 5 with parts broken away, and Fig. 8 is a rear perspective view of the removable closure plate.

As shown in the drawings the reference numeral 1 indicates the frame of the stove, 2 the open-top section, and 3 the oven-section separated from the open-top by the oven side-wall 4 and comprising an upper baking oven and a broiling or toasting oven below the baking oven and at the side of the burner-box of the open-top, having the usual drop doors 5 and 6 respectively, and with a sheet-metal partition 7 removably arranged between the ovens and above the oven gas-burner in the conventional manner. The spaces between the outer walls and the oven-lining 8 provide the usual flues at the sides and back through which the hot products of combustion pass from the oven-burner and circulate about the baking chamber, the side flues being closed at their fronts on each side of the doors by the beading strips 9 of the front-frame of the stove. The gas-supply manifold 10 is arranged at the front of the open-top and connected by suitable pipes to the usual series of burners 11 in the burner-box controlled by the usual valves 12 and having the usual secondary air-mixers 13.

The oven-burner is a duplex central-heat burner composed of the sections 14 and 15, the former being U-shaped in contour and the latter being T-shaped in contour and arranged between the parallel arms of the other section. The sections of the oven-burner are preferably cast integral but are independently supplied with fuel through their respective supply pipes 16 and 17, which are curved or bent laterally at the front ends of the sections to pass to one side of the burner and through an elongated passage 18 in the side of the oven at the front of the burner-box, and are then bent or curved forwardly at the inner side of the burner-box and extended to bring their valved secondary-air mixers 19 out of the front thereof opposite the gas-manifold and in line with their gas-supply nozzles 20 thereon. In practice the nozzles 20 of both sections of the oven-burner are preferably controlled by a single valve 21 on the gas-manifold of the type shown in the sole application of George D. Wilkinson filed August 15, 1921, Serial Number 492,232, though it is obvious that any suitable control valves may be employed to regulate the supply of gas to the burner sections. Both sections of the burner have gas ports or jets 22 on their under sides, those for the arms or bars of the section 14 and for the main arm or stem of the section 15 being preferably arranged in double rows, while those for the cross-arms of section 15 are in a single row on their inner sides. The burner is disposed centrally in the oven with its arms of the section 14 and the main arm or stem of the section 15 arranged longitudinally therein or extending from front to rear, and is detachably supported in the broiling oven below the partition 7 by its lugs 23 mounted on the brackets 24 on the front and rear oven walls. The parts are so proportioned and arranged that when the burner is in place the supply pipes lie in the front end of the passage 18 and their air-mixers 19 are in registry with their gas-nozzles on the manifold in front of the open-top, as shown in full lines in Fig. 2.

The rectangular passage or aperture 18 extends through the oven-lining 8 and sidewall 4 below the plane of the plate 7 and near the front end of the wall 4; it affords a passage between the burner-box and broiling-oven of sufficient size to allow the supply pipes and air-mixers 19 of the burner to freely pass through it so that all the burner parts can be removed and replaced as a unit. The aperture is elongated from front to rear so that the laterally offset outer ends of the supply pipes will clear its rear end when the burner is swung around in the oven as shown in dotted lines in Fig. 2. The front end of the aperture in the side-wall 4 is reduced in width to provide the opposite upper and lower shoulders 25 and 26, and the sidewall carries a plate 27 bolted thereto and having an open-end curved slot 28 that is substantially C-shaped in contour and flush with the edges of the reduced portion of the aperture. The plate 27 has an internal curved flange 29 which is flush with margin of its slot 28 and extends across the fluespace between the wall 4 and the oven-lining 8. The ends of the flange 29 terminate short of the shoulders 25 and 26, and are provided with aligned vertical shoulders 30 forming seats on their inner faces.

A removable closure plate 31 fits over the aperture 18 and is formed at its front end with an open-end curved slot 32 whose ends are in substantial alinement with the ends of the slot 28, so that these two slots form an oblong opening for the pipes 16 and 17. The plate 31 is provided on its inner face inside its edges or margins with a collar composed of upper and lower horizontal flanges 33 and a vertical inclined flange 34 at its rear fitting into the opening 18 and extending across the flue-space between the wall 4 and oven-lining 8. The flanges 33 are located between the side edges of the plate and the ends of the open-slot 32, and an inner curved flange 35 extends around the margin of this slot, having its ends inside and merging with the ends of the flanges 33 and being of the less height than the latter flanges to bring its inner edge substantially in alinement with the shoulders 30 on the flange 29 as shown in Fig. 5. The merged front ends of the flanges 33 and 35 extend beyond the ends of the plate 31 and are reduced in height as at 36 to form projections to pass back of the shoulders 25 and 26 of the wall 4 to interlock therewith; the inner portions of the ends of the flanges 33 are notched as at 37 to align with the ends of the flange 29. The flanges support the closure plate in position and the rear end of the plate is held in place by a latch 38 pivoted on the wall 4 and overlying its outer face which is provided with a stop lug 39 for the latch. When the latch is thrown up the lug may be grasped and the rear end of the plate 31 swung outward and forward into the burner-box, the front ends 36 of its flanges turning on the shoulders 25 and 26 as pivots, and when the plate is thus swung sufficiently to enable the rear flange 34 to clear the wall 4 it may then be bodily moved or slid rearwardly sufficiently to withdraw the flange ends 36 from behind the shoulders, when it is entirely detached from the wall.

The supply pipes 16 and 17 are provided with flanges 40 which when the burner is in place in the oven lie against the shoulders 30 and the edge of the inner flange 35; when these pipes are laterally spaced apart, as in the form shown, a coupling-web 41 is extended between them and thus forms a baffleplate that closes the oblong slot between the flanges 29 and 35 through which these pipes extend. The closure plate 31 closes the passage between the burner-box and the oven so that no fumes from the burner-chamber of the former can pass into the latter, and no drafts or air currents from the outside can affect the oven-burner. The flanges 40 and web 41 supplement this action of the closure plate 31, and when the parts are assembled the passage 18 is practically closed. As the curved flange 29 on the plate 27 and the flanges 33 and 34 on the plate 31 extend across the flue-space between the wall 4 and the lining 8 of the oven no communication between the flue-space and the oven exists at the passage or aperture 18.

In assembling the burner in the oven the closure plate is removed to open the aperture 18 as shown in Fig. 4, and the burner is presented to the door-opening of the broiling oven in position to pass its air-mixers 19 into it in alinement with the aperture and then is turned bodily in a horizontal plane to pass the mixers through the aperture 18 as shown in dotted lines in Fig. 2, and then it is further turned into the oven to its final position as shown in full lines, it being of course understood that the oven and its door-opening are wide enough to receive the parts and permit these movements. When the burner is turned into the oven in position to engage its supports 24 its supply-pipes are in the front end of the aperture and its airmixers 19 are in alinement with their gas-supply jets 20. The reduced ends 36 of the flanges of the closure plate are then inserted back of the shoulders 25 and 26, and the plate is swung into position over the aperture where it is locked by turning the latch 38, as shown in Fig. 3. The supply-pipes 16 and 17 now extend through the oblong slot provided by the opposite flanges 29 and 35, with the flanges 40 in position against the shoulders 30 and flanges 35 to carry the pipes. The burner-unit is now in place and the passage between the oven and burner-box is closed. To remove the burner-unit the closure plate 31 is detached as above explained to uncover the passage 18, and the burner is reversely swung and drawn forward through the door as shown in dotted lines in Fig. 2, and the supply pipes and air mixers 19 are withdrawn through the aperture and door-opening. In assembling or disassembling the burner-unit in the oven it is not necessary to connect or disconnect the gas-manifold or any of the parts of the burner-unit; the positioning of the burner on its supports 24 automatically brings the supply pipes 16 and 17 into the forward end of the aperture and brings the air-mixers 19 into register with the gas nozzles 20, and its withdrawal is accomplished without loosening any part of the manifold or any part of the burner-unit.

The oven may be located at either side of the open-top section according as the stove has a right or left hand oven with its sidewall 4 and aperture 18 correspondingly located, and the burner with its supply pipes and air-mixers is made in right and left units so that it can be used in either form of stove. In the drawings we have shown a right-hand oven stove, and it is obvious that the same elements and features of construction are employed when the oven is located at the left hand side as when it is at the right hand side.

By our invention a center-heat oven burner, which provides central heat in the oven and its uniform distribution to all its parts for both maximum heat and low heat purposes, together with its supply pipes and air-mixers is removable and replaceable as a unit through the oven door, and has its control at the burner-box manifold of the open-top and at the side of the oven-doors, so that the valve mechanism of the burner is located in front of the open-top and at a point where it does not interfere with either door of the oven and the upper door may be swung down to horizontal position to fully uncover the baking chamber, and on the other hand when the upper door is opened the burner valve is not covered or concealed by it, and when either door is opened the hot air from the oven cannot enter the burner mixer. Also, the passage between the oven and burner-box through which the supply-pipes and air-mixers pass is at the front of the burner-box so that the closure plate is easily accessible from the front of the stove, and the operator has an unobstructed view for handling the plate and moving the air-mixers through the passage, and when the parts are in place the passage is entirely closed so that no fumes or air can leak through from the burner-chamber of the open-top into the oven. Also, the burner-unit including its lighter formed by the cross bar of the section 15 is removable and replaceable for cleaning purposes by merely detaching and attaching the closure plate, and without uncoupling and coupling any part of the unit, and so does not require any work or attention on the part of the operator in handling the unit to bring all its parts into its proper position, and the mere location of the burner on its supports automatically positions the supply tubes to bring their air-mixers into alinement with their gas-nozzles on the manifold of the open-top, and positions the lighter at the front of the oven.

We claim:

1. In a gas range, an open-top section having a burner-box, a gas-manifold in front of the open-top, an oven having a door and an aperture in the front portion of its side in line with the burner-box, a duplex oven-burner constructed to extend longitudinally of the oven and having independent supply connections at the front end constructed to extend through the aperture and terminate at the manifold, the aperture being of sufficient area to pass the supply connections to permit their unitary removal and replacement with the burner through the oven door, and a plate mounted on the oven to close the aperture.

2. In a gas range, an open-top section having a burner-box, a gas-manifold in front of the open-top, an oven having a door and an aperture in the front portion of its side in line with the burner-box, brackets on the front and rear oven-walls, a duplex oven-burner comprising integral sections constructed to extend from front to rear of the oven and having front and rear supports engaging the brackets and supply pipes at the front ends of the sections constructed to extend through the aperture and terminating in air-mixers at the manifold when the burner is in place in the oven, the aperture being of sufficient area to pass the mixers to permit their unitary removal and replacement with the burner through the oven door, and a plate mounted on the oven to close the aperture.

3. In a gas range, an open-top section having a burner-box, a gas-manifold in front of the open-top, an oven having a door and an aperture in its side in line with and near the front of the burner-box, a duplex oven-burner comprising integral sections constructed to extend from front to rear of the oven and having front supply pipes extending through the aperture and terminating in air-mixers at the manifold, the aperture being of sufficient size to pass the mixers to permit the burner with its pipes and mixers to be removed as a unit through the oven door, and a plate in the burner-box removably mounted on the oven to open and close the aperture and having flanges fitting into the aperture when the plate closes it.

4. In a gas range, an open-top section having a burner-box, a gas-manifold in front of the open-top, an oven having a door and a lining and an aperture in its side-wall and lining in line with and near the front of the burner-box, a duplex oven-burner comprising integral sections having front supply pipes extending through the aperture and air-mixers at the manifold, the aperture being of sufficient area to pass the mixers to permit their unitary removal and replacement with the burner through the oven door, a flange on the wall at the front end of the aperture, and a flanged plate mounted on the oven to open and close the aperture, the flanges on the plate and wall constructed to extend across the flue-space between the wall and lining.

5. In a gas range, an open-top section having a burner-box, a gas-manifold in front of the open-top, an oven having a door and an elongated aperture in its side in line with and near the front of the burner-box, a duplex oven-burner comprising integral sections having front supply pipes extending through the aperture and air-mixers at the manifold, the aperture having shoulders at its front end and being of sufficient area to pass the mixers to permit their unitary removal and replacement with the burner through the oven door, and a plate having projections constructed to extend into the aperture and engage the shoulders of the same, and latch to hold the plate in position to close the aperture.

6. In a gas range, an open-top section having a burner-box, a gas-manifold in front of the open-top, an oven having a door and an elongated aperture in its side-wall and lining in line with and near the front of the burner-box, an oven-burner comprising integral sections constructed to extend from front to rear of the oven and having front supply pipes extending through the aperture and air-mixers at the manifold, the aperture having shoulders at its front end and being of sufficient size to pass the mixers to permit the burner and its pipes and mixers to be removed as a unit through the oven door, a curved flange extending between the side-wall and lining at the front end of the aperture and having vertical shoulders on its inner portion, a removable plate having a curved open-end slot at its front end and internal flanges extending through the aperture in the side-wall and lining and reduced at their front ends to engage behind said first shoulders, a curved flange on the plate flush with its open-end slot and having its edge in alignment with said vertical shoulders, flanges on the burner-pipes seating on said vertical shoulders and flange-edge, and a latch on the side-wall to engage the rear end of the plate.

7. In a gas range, an open-top section having a burner-box, a gas-manifold in front of the open-top, an oven having a door and an elongated aperture in its side-wall and lining in line with and near the front of the burner-box, an oven-burner comprising integral sections constructed to extend from front to rear of the oven and having front supply pipes extending through the aperture and air-mixers at the manifold, the aperture having shoulders at its front end and being of sufficient size to pass the mixers to permit the burner and its pipes and mixers to be removed as a unit through the oven door, a curved flange extending between the side-wall and lining at the front end of the aperture, a removable plate having a curved open-end slot at its front end and internal flanges extending through the aperture in the side-wall and lining and reduced at their front ends to engage behind said shoulders, and a latch on the side-wall to engage the rear end of the plate.

In testimony whereof we affix our signatures.

GEO. D. WILKINSON.
AUGUSTUS F. HARTER.